United States Patent [19]

Morita

[11] Patent Number: 5,503,272
[45] Date of Patent: Apr. 2, 1996

[54] CASE FOR A MAGNETIC TAPE CASSETTE HAVING HUBS WITH SECURING GROOVES

[75] Inventor: Kiyoo Morita, Kanagawa, Japan

[73] Assignee: Fuji Photo Film Co., Ltd., Kanagawa, Japan

[21] Appl. No.: 308,436

[22] Filed: Sep. 19, 1994

[30] Foreign Application Priority Data

Oct. 14, 1993 [JP] Japan .................. 5-060282 U

[51] Int. Cl.$^6$ .................................. B65D 85/672
[52] U.S. Cl. ...................... 206/387.1; 206/493
[58] Field of Search ............... 206/387.1, 387.13, 206/493

[56] References Cited

U.S. PATENT DOCUMENTS

| | | | |
|---|---|---|---|
| 3,638,788 | 2/1972 | Solomori . | |
| 3,896,929 | 7/1975 | Mills | 206/387.1 |
| 4,333,568 | 6/1982 | Weldin | 206/387.1 |
| 4,753,347 | 6/1988 | Bellarte et al. | 206/387.1 |
| 5,042,659 | 8/1991 | Morita | 206/387.1 |
| 5,160,028 | 11/1992 | Morita | 206/387.1 |

FOREIGN PATENT DOCUMENTS

| | | |
|---|---|---|
| 0494690 | 1/1992 | European Pat. Off. . |
| 0523720 | 7/1992 | European Pat. Off. . |
| 0523720A2 | 7/1992 | European Pat. Off. . |
| 0537678 | 10/1992 | European Pat. Off. . |

OTHER PUBLICATIONS

Patent Abstracts of Japan; Publication No. JP4311484; Abstracts Publication Date Apr. 11, 1992.

*Primary Examiner*—Bryon P. Gehman
*Attorney, Agent, or Firm*—Sughrue, Mion, Zinn, Macpeak & Seas

[57] ABSTRACT

In the storage case, the positions of rotation preventive projections (67) on the casing side opposing wall (65) of a casing part (62) are respectively set in common areas shared in common by forward loading areas corresponding to the positions of the hubs when the tape cassette (2) is loaded onto a cover part (61) forwardly and by reverse loading areas corresponding to the hub positions when the tape cassette (2) is loaded onto the cover part (62) reversely, and the rotation preventive projections (67) respectively include securing grooves (71) into which hub claws (23) provided on the inner periphery of the hubs (22) can be fitted.

10 Claims, 6 Drawing Sheets

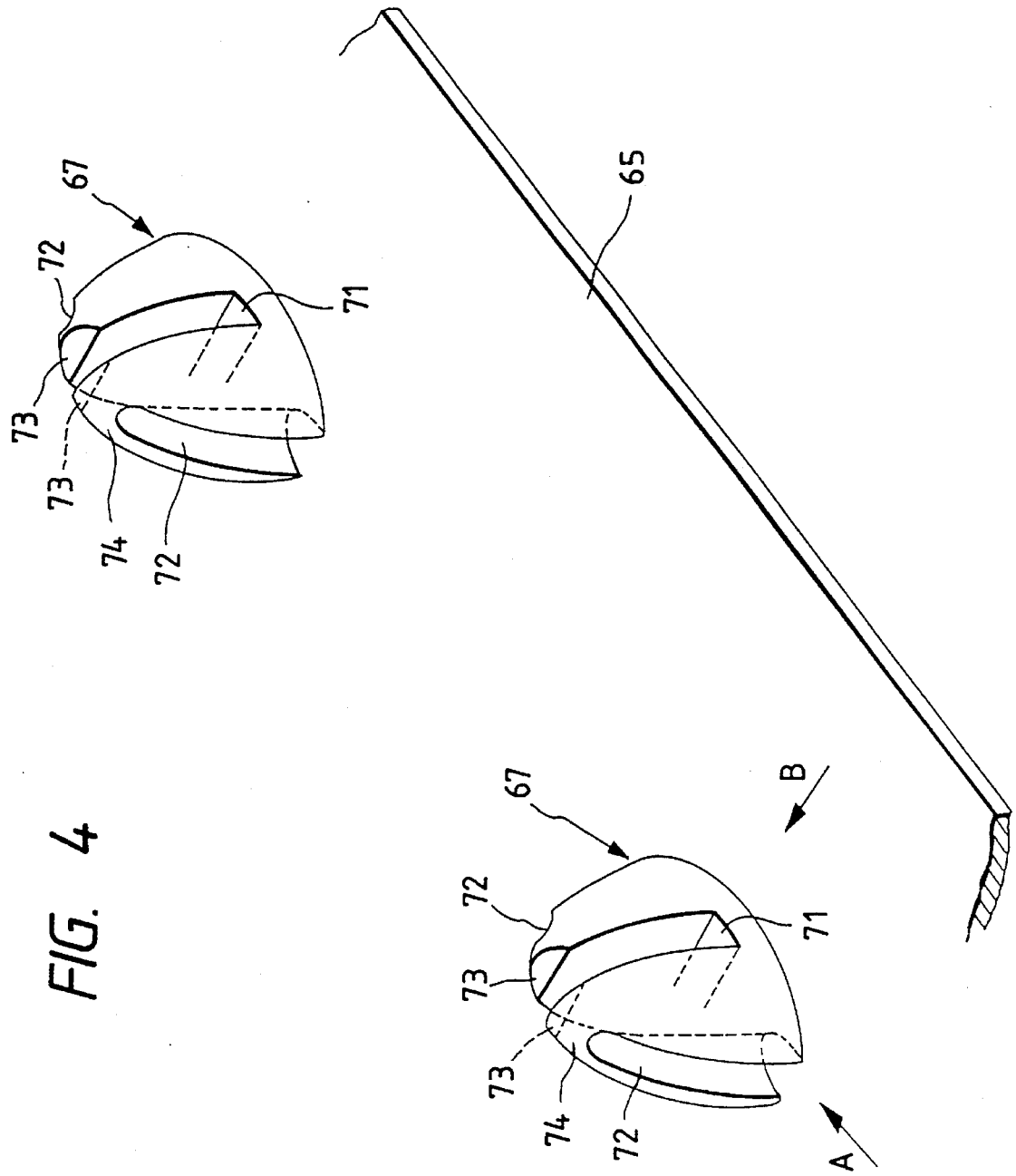

CASE FOR A MAGNETIC TAPE CASSETTE HAVING HUBS WITH SECURING GROOVES

BACKGROUND OF THE INVENTION

The present invention relates to a case for a magnetic tape cassette and, in particular, to an improved case for a magnetic tape cassette which is used to keep a magnetic tape cassette for audio.

Conventionally, a magnetic tape cassette used for audio and the like (which will be hereinafter referred to simply as a tape cassette) includes a front opening portion into which a magnetic head or the like is inserted when the tape cassette is loaded into recording/reproducing apparatus or the like, and also a magnetic tape so mounted as to cross the front opening portion. Therefore, in order to prevent dust from getting into the tape cassette through front opening portion as well as to protect the magnetic tape exposed to the front opening portion and the whole tape cassette, the tape cassette is ordinarily stored in a case for a magnetic tape cassette (which will hereinafter be referred to simply as a storage case) for storage.

In FIG. 8, there is shown a conventional storage case. In this figure, a storage case 1 includes a cover part 11 and a casing part 12 which is connected to the cover part 11 openably and closably. And the cover part 11 includes a cover side opposing wall 13 to extend along one surface of a tape cassette 2 and a pocket 14 which is disposed in one end side of the cover side opposing wall 13 and into which the front opening portion 21 of the tape cassette 2 can be inserted. As shown in FIG. 1, in the storage case, an index card 3 and tape cassette 2 can be inserted into and removed from the pocket 4 along the cower side opposing wall 13.

On the other hand, the casing part 12 includes a casing side opposing wall 15 for covering the other surface of the tape cassette 2 loaded on the cover part 11, two pivotally mounting portions 16 for connecting the casing side opposing wall 15 to the cover part 11 rotatably, and a pair of rotation preventive projections 17 projectingly provided on the casing side opposing wall 15.

Here, the pivotally mounting portions 16 include, for example, two shaft-like projections provided in the inner portions of the casing part 12 to be fittable into two bearing holes respectively formed in the two side walls of the pocket 14 of the cover part 11, so that the cover part 11 and casing part 12 can be rotatably connected to each other. And, referring to the rotation preventive projections 17, when the cover part 11 or casing part 12 is rotated about the pivotally mounting portions 16 to close the casing side opposing wall 15 with respect to the cover part 11, the rotation preventive projections 17 are engaged with hubs 22 provided in the tape cassette 2 to prevent the tape from being loosened while it is kept.

In particular, each of the rotation preventive projections 17 includes a securing piece 18 the width dimension of which is set such that the securing piece 18 can be projected between mutually adjoining hub claws 23 provided on the inner periphery of each of the hubs 22, and a projection piece 19 provided perpendicularly to the securing piece 18 and having two side portions facing their opposing hub claws 23.

Both of the securing piece 18 and projection piece 19 are cut obliquely at the top end sides for easy fitting into the hub 22.

For reference, in FIG. 8, an arrow (a) indicates the direction of opening and closing of the cover part 11, while an arrow (b) indicates the direction of insertion of the index card and tape cassette 2 into the cover part 11.

However, in the above conventional case, as shown in FIG. 9, the plate thickness dimension W1 of the securing piece 18 in the rotation preventive projection 17 is far smaller than a distance W0 between the two adjoining hub claws 23 of the hub 22. Due to this dimensional difference, even if the rotation preventive projection 17 is in engagement with the hub 22, the hub 22 is rotatable in the range of W2=W0−W1. Such rotational movement of the hub 22 causes the tape exposed to the front opening portion 21 to be loosened or causes the two side portions of the projection piece 19 to be shifted from their accurately determined opposing positions to the hub claws 23 to thereby fail to restrict the play of the hub. Therefore, when carrying the case, such free play causes unfavorable shocks to be given to the hub and tape.

Also, the position of the hub 22 of the tape cassette 2 is nearer to the rear end side of the cassette in the longitudinal direction of the cassette. That is, as shown in FIG. 10, when two tape cassettes 2 are superimposed on top of each other in a vertical direction (the other cassette is shown by imaginary lines), there actually exists a common area 4 in which the hub holes of the two tape cassettes are superimposed on each other, but, in fact, the position of the common area 4 is greatly shifted in the cassette longitudinal direction.

For this reason, in the storage case 1 in which the rotation preventive projections 17 are designed on the assumption that the tape cassette 2 is loaded into the pocket 14 from the front opening portion 21 side thereof, if the tape cassette 2 is inserted reversely in error, then the case cannot be closed and thus the direction of the tape cassette 2 must be corrected before it is loaded again.

SUMMARY OF THE INVENTION

In view of the above circumstances, the present invention aims at eliminating the above problems found in the conventional storage case. Accordingly, it is an object of the invention to provide a storage case which allows a tape cassette to be inserted not only forwardly but also reversely, and can position and fix the hubs of the tape cassette more accurately to prevent troubles caused by unexpected shocks due to the loosened tape and rickety hubs when the hubs are rotated, thereby providing a storage case which is easy and free to handle.

In attaining the above object, according to the invention, there is provided a case for a magnetic tape cassette comprising a cover part including a cover side opposing wall to extend along one surface of the magnetic tape cassette and a pocket disposed at one end side of the cover side opposing wall to be able to store therein one end portion of the magnetic tape cassette, and a casing part including, on its casing side opposing wall facing the cover side opposing wall, rotation preventive projections respectively engageable with hubs provided in the magnetic tape cassette for securing the hubs, the casing part being pivotally mounted to the cover part openably and closably, wherein the positions of the rotation preventive projections are set in the common areas of the hubs shared in common when the magnetic tape cassette is loaded both forwardly and reversely, the whole shape of each of the rotation preventive projections is gradually enlarged in diameter from the leading end side thereof toward the base portion side thereof, and each of the rotation preventive projections includes a securing groove into which a hub claw provided on the inner peripheral portion of the hub can be fitted.

Also, the above object can be achieved by providing a case in which the upper end side of the securing groove of each of the rotation preventive projections includes an inclined surface for inviting the hub claw into the securing groove. Further, the above object can be attained by providing a case in which, to the casing and cover parts, there are respectively added thinner structures including recessed portions for receiving the increased thickness portion of the magnetic tape cassette in order to allow both forward and reverse loading of the magnetic tape cassette.

BRIEF DESCRIPTION OF THE DRAWINGS

FIG. 4 is an enlarged perspective view of the main portions of the embodiment of the invention;

DESCRIPTION OF THE PREFERRED EMBODIMENTS

Figure 1:
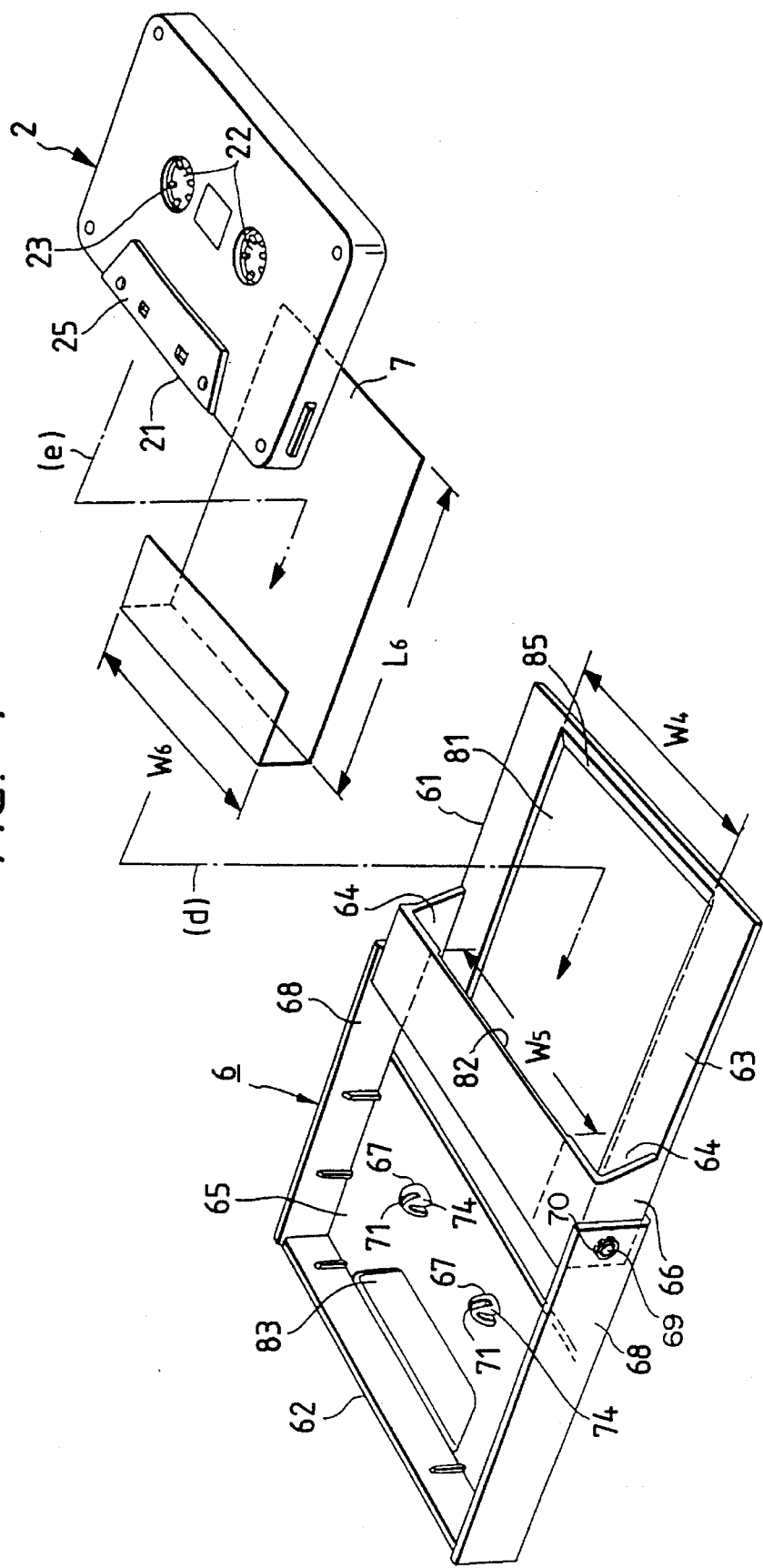
FIG. 1 is a perspective view of an embodiment of a storage case according to the invention.

Description will be given hereinbelow of the invention with reference to the accompanying drawings. FIG. 1 is a perspective view of an embodiment of a storage case according to the invention.

A storage case 6 according to the present embodiment, similarly to the conventional storage case, includes a cover part 61 and a casing part 62 which is connected to the cover part 61 openably and closably. And the cover part 61 includes a cover side opposing wall 63 to extend along one surface (in the illustrated embodiment, back surface) of a tape cassette 2, and a pocket 64 which is disposed in one end side of the cover side opposing wall 63 and into which the front opening portion 21 of the tape cassette 2 can be inserted. Also, as shown in FIG. 1, an index card 7 and tape cassette 2 can be inserted into and removed from the pocket 64 along the cover side opposing wall 63.

Figure 2:
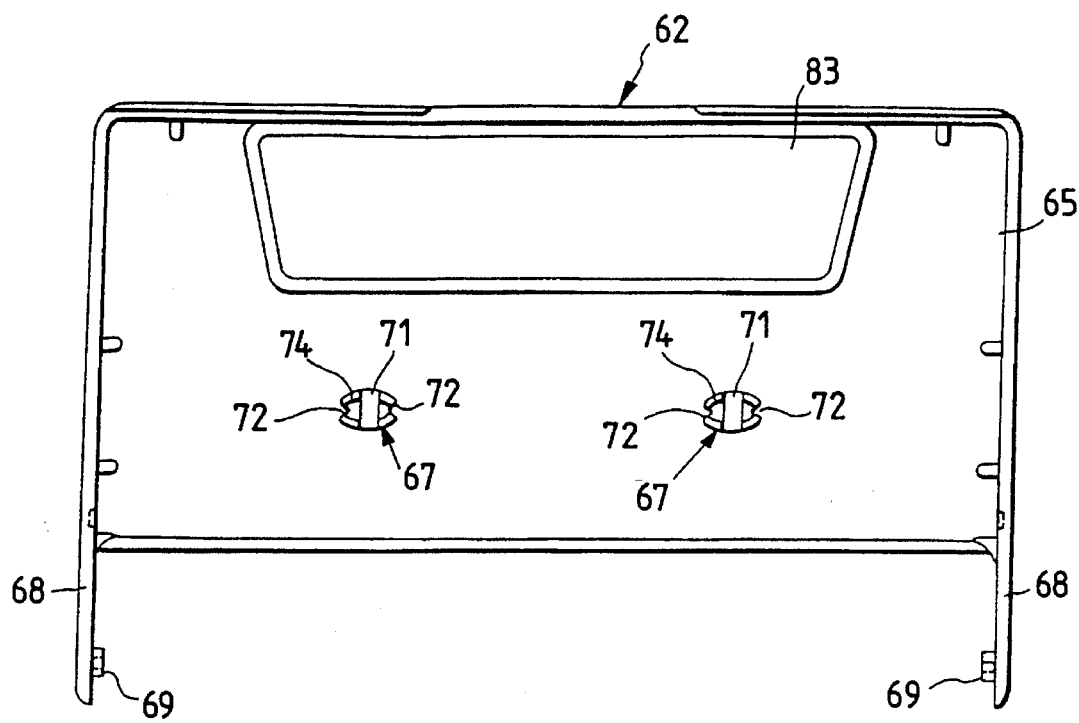
FIG. 2 is a plan view of a casing part employed in the embodiment of the invention.

On the other hand, the casing part 62 includes a casing side opposing wall 65 for covering the other surface (in the illustrated embodiment, front surface) of the tape cassette 2 loaded on the cover part 61, a pivotally mounting portion 66 for connecting the casing side opposing wall 65 to the cover part 61 rotatably, and a pair of rotation preventive projections 67 projectingly provided on the casing side opposing wall 65. The pivotally mounting portion 66 is arranged such that, for example, as shown in FIG. 2, shaft-like projections 69 are provided on the two side walls 68 of the casing part 62 and the shaft-like projections 69 are then fitted into bearing holes (70) formed in the two side walls of the pocket 64 of the cover part 61, whereby the cover part 61 and casing part 62 are rotatably connected to each other.

Referring to the rotation preventive projections 67, when the cover and casing parts are rotated about the pivotally mounting portion 66 and thus the casing side opposing wall 65 is closed with respect to the cover part 61, the rotation preventive projections 67 are engaged with hubs 22 provided in the tape cassette 2 loaded on the cover part 61 to prevent the tape from being loosened while it is kept.

In the present embodiment, the positions of the rotation preventive projections 67 on the casing side opposing wall 65 are set in common areas shared in common by forward loading areas corresponding to the hub positions when the tape cassette 2 is loaded forwardly (for example, in a direction in which the front opening portion 21 is inserted into the pocket 64 of the cover part 61) and by reverse loading areas corresponding to the hub positions when the tape cassette 2 is loaded reversely, so that the rotation preventive projections 67 are engageable with the hubs 22 of the tape cassette 2 loaded on the cover plate 61 whether the tape cassette 2 is loaded onto the cover plate 61 forwardly or reversely. The common areas mean the spindle-shaped (or elliptical) areas 4 that are hatched in FIG. 10.

Each of the hubs 22 is held in the tape cassette 2 in such a manner that it can be moved in the diameter direction within a prescribed range (that is, the hub has slight play while it is held in the tape cassette 2). Therefore, the dimension L1 of the common area 4 shown in FIG. 10 in the major axis direction thereof and the dimension L2 in the minor axis direction thereof vary according to the amounts of the position shifting of the hub 22 within the tape cassette 2.

Figures 3A, 3B, 3C:
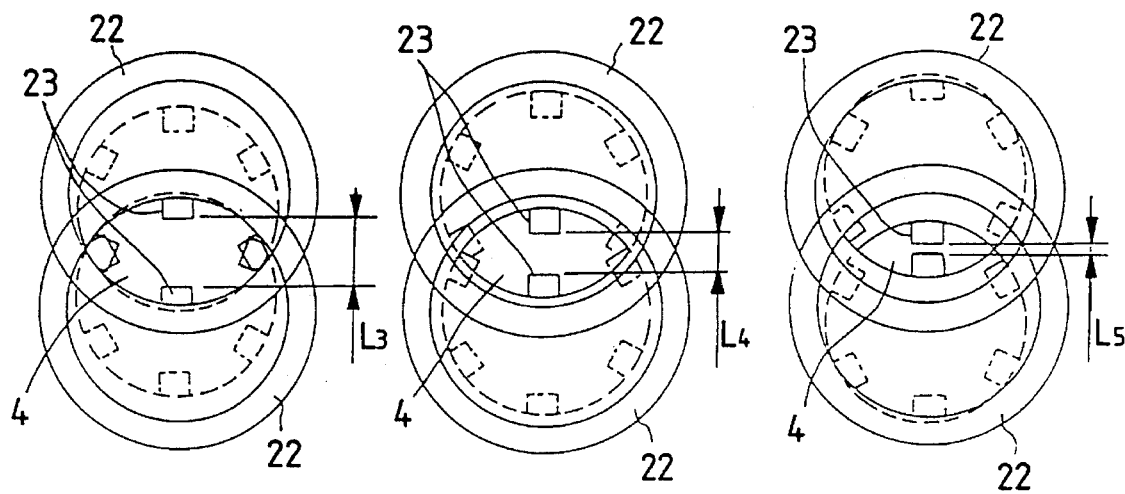
FIGS. 3(a), 3(b) and 3(c) are explanatory views of the degree of position shifting between the forward and reverse loading operations of the tape cassette.

In FIG. 3, there is shown the common area 4 which varies according to the amounts of the position shifting of the hub 22 within the tape cassette 2. That is, FIG. 3 (a) shows the common area 4 when the hub 22 is shifted in position to the greatest extent toward the rear end side of the tape cassette 2, FIG. 3 (b) shows the common area 4 when the hub 22 is not shifted in position (the hub 22 is situated substantially in the center thereof), and FIG. 3 (c) shows the common area 4 when the hub 22 is shifted in position to the greatest extent toward the front end side of the tape cassette 2. And the dimensions L3, L4 and L5 respectively indicate distances between the hub claws 23 which are projected into the common area 4 when the direction of loading of the tape cassette is changed.

Referring further to the rotation preventive projections 67, as shown in FIG. 4, each projection 67, as a whole, has a shape which is gradually enlarged in diameter from the leading end portion thereof toward the base portion thereof, it has a transverse section (a section intersecting perpendicularly to the projection direction thereof) which is set almost similar in shape to the outline of the common area 4, and it includes a securing groove 71 into which one of the hub claws 23 provided on the inner periphery of the hub 22 is fittable, and a pair of escape grooves 72 through which the hub claws 23 adjoining the above hub claw 23 are projected. Also, the securing groove 71 includes inclined surfaces 73, 74 which, when the hub claw 23 is to be fitted into the securing groove 71, invite the hub claw 23 for smooth fitting into the securing groove 71.

Figure 6:
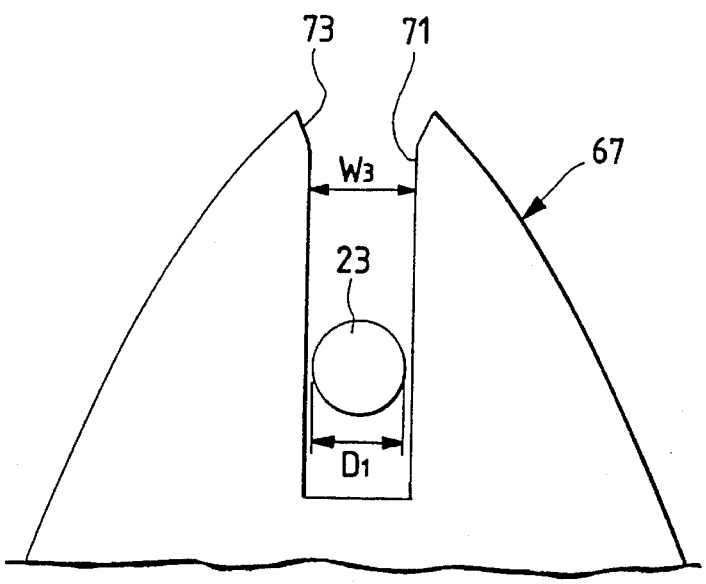
FIG. 6 is a view taken from an arrow B in FIG. 4.

As shown in FIG. 6, the securing groove 71 has a groove width W3 which is set slightly larger than the width dimension (diameter dimension) D1 of the hub claw 23 in order to prevent the hub claw 23 fitted into the securing groove from playing freely. Preferably, the groove width W3 has a width within a range of 0.1 to 0.5 mm larger than the width dimension D1 of the hub claw 23. More preferably, the the groove width W3 has a width of a 0.2 mm larger than the width dimension D1.

Figure 5:
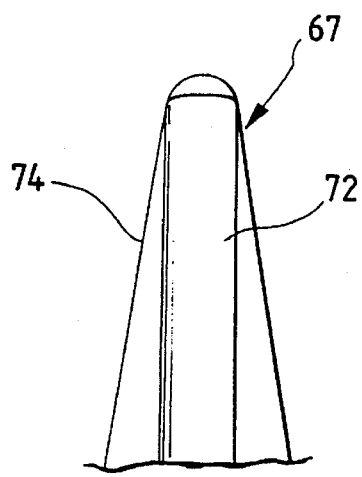
FIG. 5 is a view taken from an arrow A in FIG. 4.

Also, the escape groove 72 is used to prevent the hub claw 23 adjoining the hub claw 23 fitted into the securing groove 71 from interfering with the rotation preventive projection 67. The above-mentioned inclined surface 73, as shown in FIG. 6 as well, is an inclined surface which is provided on the upper end edge of the securing groove 71. Further, the inclined surface 74, as shown in FIG. 5 as well, is an inclined surface which is widened toward the projection base portion. When closing the storage case 6, the inclined surface 74 gets into contact with the inner peripheral surface of the hub 22 and, finally, gets into contact with the inner surface of the hub 22 with little clearance between them to thereby prevent play between them.

Figure 10:
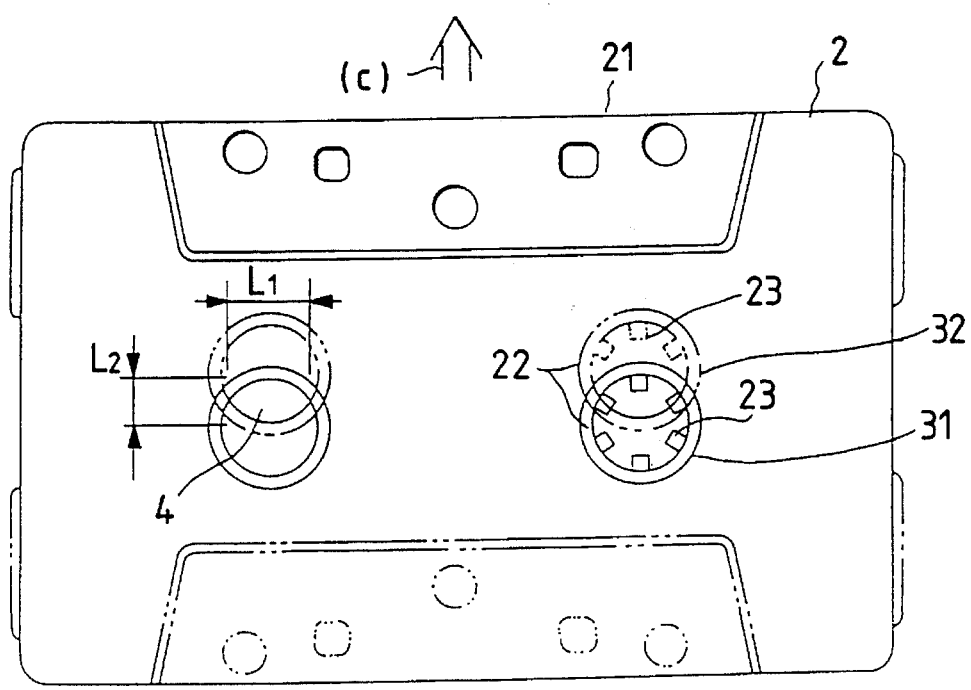
FIG. 10 is an explanatory view of the positions of hubs provided in a tape cassette.

As described above, the rotation preventive projection 67 is so formed as to have a transverse section similar to the outline shape of the common area 4 shown in FIGS. 3 and 10. In particular, in order to allow both forward and reverse loading of the tape cassette 2, the transverse section of the leading end side of the rotation preventive projection 67 is set smaller in dimension than the minimum common area 4 shown in FIG. 3 (c), while the transverse section of the base portion side of the rotation preventive projection 67 is set equal to or greater in dimension than the maximum common area 4 shown in FIG. 3 (a). Due to such dimensional setting, the outline of the rotation preventive projection 67 provides a tapered shape which, as described before, is gradually enlarged in diameter from the leading end portion side thereof toward the base portion side thereof and, therefore, when it is engaged with the hub 22, the rotation preventive projection 67 can correct the positional shifting of the hub 22 to a state shown in FIG. 3 (a) to thereby prevent the loosened play and rotation of the hub 22 quite sure.

Also, as shown in FIG. 1, the cover side opposing wall 63, pocket 64 and casing side opposing wall 65 respectively include recessed portions 81, 82 and 83 for receiving the increased thickness portion 25 of the tape cassette 2 so that the tape cassette 2 can be loaded onto the cover part 61 not only forwardly but also reversely.

The recessed portion 82 formed in the pocket 64, as shown in FIG. 1, is used to receive the increased thickness portion 25 in the forward loading of the tape cassette 2, that is, when the front opening portion 21 of the tape cassette 2 is inserted into the pocket 64. Also, the recessed portion 83 formed in the casing side opposing wall 65 is used to receive the increased thickness portion 25 in the reverse loading of the tape cassette 2, that is, when the rear end side of the tape cassette 2 is inserted into the pocket 64 (or, when the front opening portion 21 is positioned at the opening end side of the storage case).

However, the recessed portion 81 formed in the cover side opposing wall 63 is formed in a single rectangular recessed portion which is a united one of a forward loading recessed portion for receiving the increased thickness portion 25 in the forward loading of the tape cassette and a reverse loading recessed portion for receiving the increased thickness portion 25 in the reverse loading of the tape cassette. The recessed portions 81 and 82 are formed such that the width dimensions W4 and W5 thereof are equal to each other.

Also, the width dimension W6 of the index card 7 is set slightly smaller than the width dimension W4 of the recessed portion 81, and the length dimension L6 of the index card 7 to extend along the cover side opposing wall 63 is also set slightly smaller than the length dimension of the recessed portion 81.

Therefore, the recessed portion 81 consisting of a rectangular recessed portion serves also as a card storage portion which not only stores the index card 7 but also secures the end edge of the index card 7 by means of a stepped portion 85 provided in the edge portion of the recessed portion 81.

In FIG. 1, arrows (d) and (e) respectively indicate the direction of insertion of the index card 7 into the cover part 61 and the direction of insertion of the tape cassette 2 into the cover part 61.

In the storage case 6 according to the illustrated embodiment, since the positions of the rotation preventive projections 67 are set in the common area 4 shared by the forward loading area corresponding to the hub positions when the tape cassette 2 is loaded on the cover part 61 forwardly and by the reverse loading area corresponding to the hub positions when the tape cassette 2 is loaded on the cover part 61 reversely, the rotation preventive projections 67 are engageable with the hubs 22 of the tape cassette 2 loaded on the cover part 61 whether the tape cassette 2 is loaded onto the cover part 61 forwardly or reversely. Therefore, the tape cassette 2 can be inserted both forwardly and reversely, the hubs can be secured for certain, and the storage case 6 can be handled very conveniently.

Figure 7:
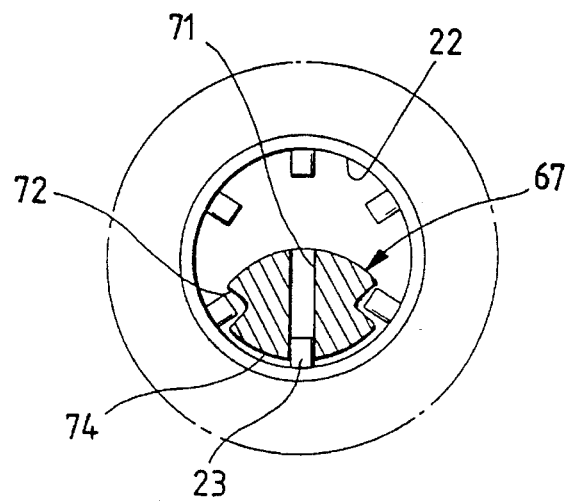
FIG. 7 is an explanatory view of the operation of the embodiment of the invention.
Figure 8:
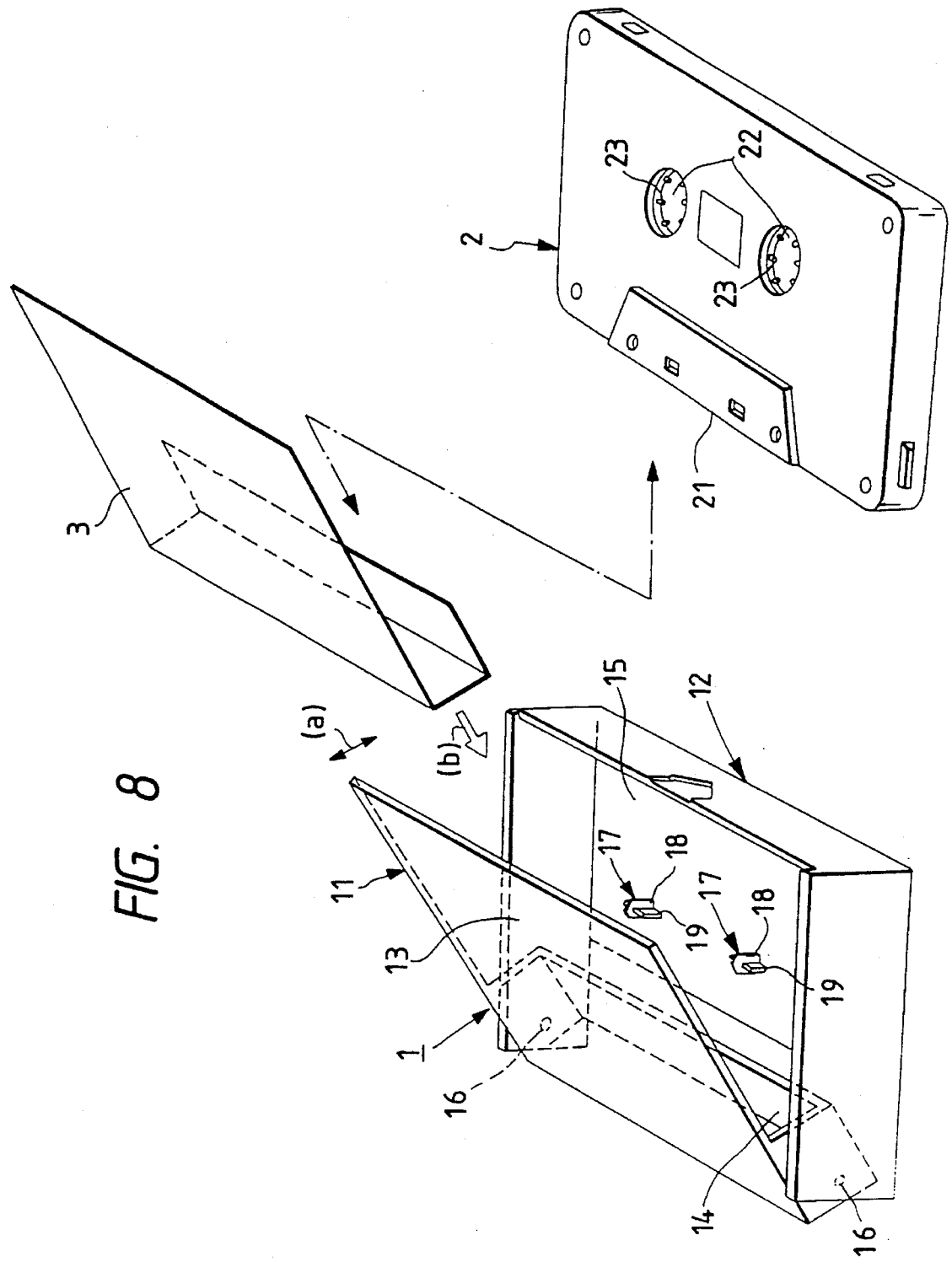
FIG. 8 is a perspective view of a conventional storage case.
Figure 9:
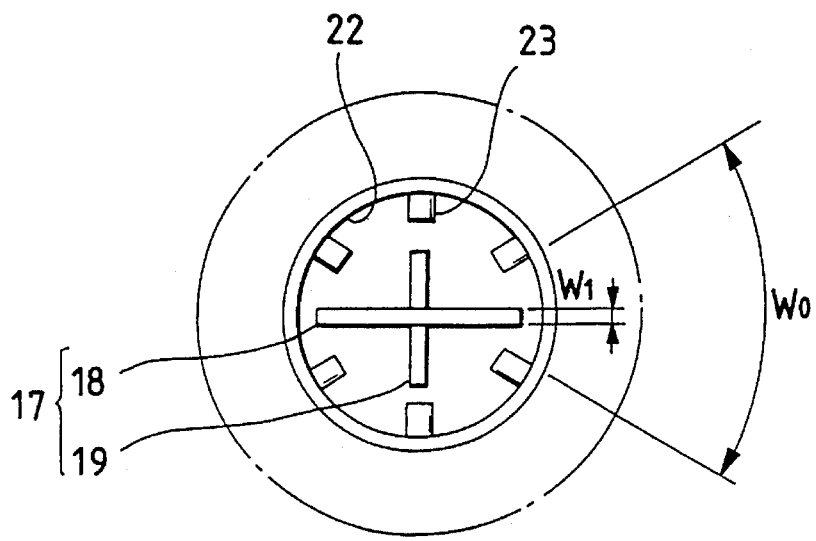
FIG. 9 is an explanatory view of problems found in the conventional storage case.

Also, when the rotation preventive projection 67 is engaged with the hub 22, as shown in FIG. 7, the hub claw 23 provided on the inner periphery of the hub 22 is engaged into the securing groove 71 and can be thereby fixed substantially, and the inclined surface 74 forming the outline of the rotation preventive projection 67 is engaged with the inner peripheral surface of the hub to thereby be able to correct the positional shifting of the hub. This makes it possible to position and fix the hub 22 of the tape cassette 2 more certainly, to prevent the tape from being loosened due to the rotation of the hub 22, and to prevent thee tape cassette from colliding with the cassette case due to the rickety hub 22.

Further, in the above-mentioned embodiment, description has been given of a storage case of a structure (in which the axis of rotation of the pivotally mounting portion of the storage case extends in the right and left directions of the cassette) in which the increased thickness portion 25 of the tape cassette 2 is received by recessed portions 81, 82, and 83 formed in the cover part 61 and casing part 62 to slim down the whole storage case 6 so as to reduce its keeping space and improve its portability, and also in which the front side or rear side of the magnetic tape cassette 2 is inserted into the pocket 64. However, the invention is not limited to this but can also be applied to a storage case of a structure in which the axis of rotation of the pivotally mounting portion extends in the back-and-forth direction of the cassette (that is, in which the right and left end portions of the cassette are inserted into the pocket). Also, the invention can also be applied to a storage case having a structure which is not slimmed down like the above-mentioned embodiment.

As has been described heretofore, in a case for a magnetic tape according to the invention, the positions of the rotation preventive projections are set in the common area shared in common by the forward loading areas corresponding to the hub positions when the magnetic tape cassette is loaded onto the cover part forwardly and by the reverse loading areas corresponding to the hub positions when the magnetic tape cassette is loaded onto the cover part reversely. Such position setting allows the rotation preventive projections to be engaged into the hubs of the tape cassette loaded on the cover part whether the tape cassette is loaded onto the cover part forwardly or reversely. That is, the tape cassette can be inserted not only forwardly but also reversely, so that the present storage case is improved in handling.

Also, when the rotation preventive projections are engaged with the hubs, the hub claws provided on the inner periphery of the hubs are inserted into their associated securing grooves of the rotation preventive projections and thereby can be substantially fixed there, and the inclined surfaces forming the outline of the rotation preventive projections are engaged with the inner peripheral surfaces of the hubs to thereby be able to correct the position shifting of the hubs to a predetermined state. This structure makes it possible to position and fix the hubs of the tape cassette more accurately, can prevent the loosened tape and rickety hubs for sure, and can prevent the action of shocks due to the rickety hubs.

What is claimed is:

1. A case for a magnetic tape cassette comprising a cover part including a cover side opposing wall to extend along one surface of a magnetic tape cassette and a pocket disposed at one end side of the cover side opposing wall to be able to store one end portion of the magnetic tape cassette, and a casing part including a casing side opposing wall facing the cover side opposing wall, and rotation preventive projections provided on the casing side opposing wall and engageable with hubs provided in a magnetic tape cassette for securing the hubs, said casing part being pivotally mounted to the cover part, wherein the position of each rotation preventive projection is set in one of the areas of two hubs shared in common when two magnetic tape cassettes have been loaded in opposite orientation with respect to one another, and said rotation preventive projections are each arranged in a shape which, as a whole, is gradually enlarged in diameter from a free end side thereof toward a base portion side thereof which is attached to said casing side opposing wall, each projection including securing grooves into which hub claws projectingly provided on the inner periphery of a hub of a magnetic tape cassette can be fitted.

2. A case for a magnetic tape cassette as set forth in claim 1, wherein said securing grooves of said rotation preventive projections each include at the upper end side thereof an inclined surface for inviting hub claws into said securing groove.

3. A case as recited in claim 2, wherein said rotation preventive projections each have a transverse cross-sectional shape which corresponds to the transverse cross-sectional shape of one of the common areas.

4. A case as recited in claim 3, wherein said securing grooves each have a width which is slightly larger than a width of one of the hub claws.

5. A case as recited in claim 4, wherein the width of each of said securing grooves is in the range of 0.1 to 0.5 mm larger than the width of one of the hub claws.

6. A case as recited in claim 5, wherein the width of each of said securing grooves is 0.2 mm larger than the width of one of the hub claws.

7. A case for a magnetic tape cassette as set forth in claim 1 or 2, wherein said casing and cover parts each include a recessed portion for receiving an increased thickness portion of a tape cassette in order to allow both forward and reverse loading of a tape cassette, and said recessed portions enable said case to be thin.

8. A case as recited in claim 7, wherein one of said recessed portions defines a single rectangular recess for receiving the increased thickness portion of either one of a forward and reverse loaded tape cassette.

9. A case as recited in claim 1, further comprising:
shaft members projecting from respective side walls of said casing part; and
bearing holes formed in respective side walls of said cover part which define said pocket, each of said shaft members being received in corresponding ones of said bearing holes to allow said cover part and said casing part to rotate relative to one another.

10. A case as recited in claim 9, wherein said rotation preventive projections each have a transverse cross-sectional shape which corresponds to the transverse cross-sectional shape of one of the common areas the transverse cross-sectional shape of each of the rotation preventive projections being smaller than the minimum area of the common area at said free end side of each rotation preventive projection and the transverse cross-sectional area of each of the rotation preventive projections being one of equal to and greater than the maximum area of the common area at said base portion side of each rotation preventive projection.

* * * * *